Patented Feb. 16, 1943

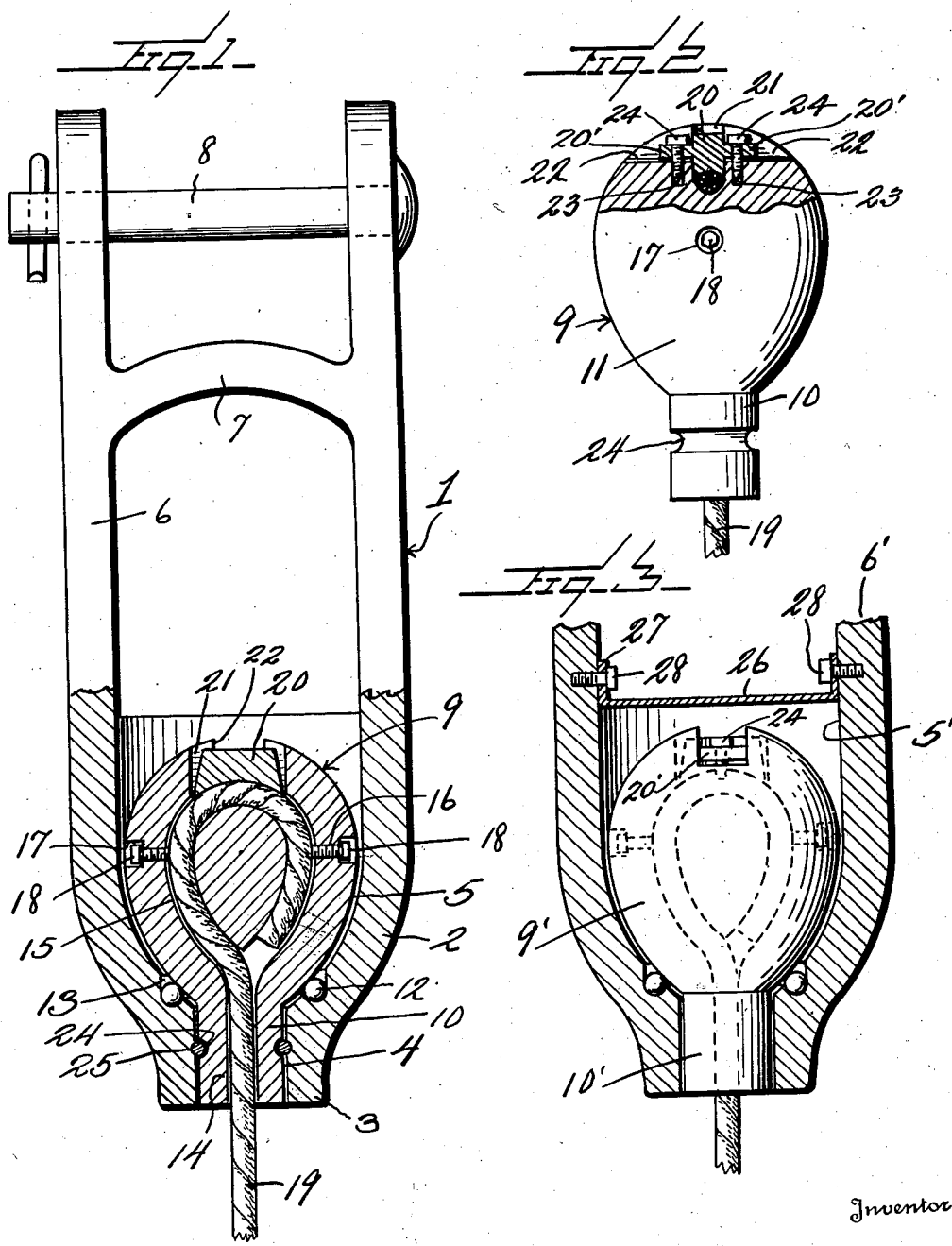

2,311,043

UNITED STATES PATENT OFFICE 2,311,043

ROPE SWIVEL AND CLAMP

Joseph R. Furey, Avonmore, Pa.

Application November 4, 1941, Serial No. 417,838

4 Claims. (Cl. 24—123)

This invention relates generally to improvements in swivel connections for ropes and pertains particularly to an improved socket swivel for steel rope such as is used in connection with coal cutting machines, as an example.

The present invention has for its primary object to provide a novel terminal unit for an end of a steel rope in which such rope end may be securely fastened but held so as to turn with respect to the unit and thereby be prevented from becoming twisted and ultimately damaged.

Another object of the invention is to provide a steel rope socket swivel in which there is provided a removable member constructed in a novel manner to facilitate the easy and quick attachment of the rope thereto in such a manner that it will be firmly held and cannot become loosened by vibration or in any other manner except by the intentional removal of the securing element.

Still another object of the invention is to provide in a device of the character stated, a novel rope end clamp and swivel socket in which said clamp is rotatably supported, together with novel means for detachably maintaining the clamp in the socket but permitting it to have rotary motion therein.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Fig. 1 is a view partly in side elevation and partly in longitudinal section of the steel rope swivel socket embodying the present invention.

Fig. 2 is a view partly in elevation and partly in section of the rope gripping or clamping unit removed from its socket.

Fig. 3 is a detailed sectional view showing a modified construction of the invention.

Referring now more particularly to the drawing wherein like numerals of reference indicate corresponding parts in the several views, the numeral 1 generally designates the body of the present device, the same being formed of any suitable material such as steel, cast iron or the like. This body comprises a cup like lower portion 2 which merges at its lower end into the neck 3 through which the axial passage 4 is formed. The interior of the portion 2 tapers slightly to the passage 4 thus forming the circular socket 5 in which the hereinafter described rope gripping unit is located.

Above the cup-like lower portion 2 the body 1 consists of two spaced parallel arms 6 which are integral with the top edge of the portion 2 and which are connected adjacent their upper ends in any suitable manner, as by the provision of the cross piece or yoke 7. Above the yoke 7 the arms 6 are suitably formed to receive a bolt 8 which passes transversely between them and provides a means for attaching the body to any suitable carrier or support.

The rope securing or gripping unit, which is rotatably maintained in the socket 5, is indicated generally by the numeral 9. This body is of circular cross-section and exteriorly has a substantially pear-like contour, the tapered end of which is directed downwardly and merges into the axially directed stem 10 which is of a size to snugly position in the passage 4. The tapered and rounded lower part 11 of the cable securing or gripping body 9 conforms generally to the contour of the socket 5 so that the body may rotate in the socket on the axial center thereof.

In order to reduce friction between the bodies it is preferred that a suitable type of anti-friction means be interposed between the body 9 and the wall of the socket 5, and such means is here illustrated as being in the form of bearing balls 12 which are supported in a suitable annular raceway 13 formed in the surface of the socket, as shown in Fig. 1. Obviously any other suitable anti-friction means may be employed where found convenient or desirable.

The stem 10 has a cable receiving passage 14 formed axially therethrough and this passage merges into a substantially elliptical passage 15 formed in the body of the gripper as shown.

At diametrically opposite sides of the gripper body threaded bores 16 are formed which enter the passage 15 and which at their outer ends are enlarged, as indicated at 17. These bores are designed to receive binding screws 18 and the heads of these screws are disposed beneath the plane of the surface of the body 9 within the recesses 17 when the screws are extended inwardly to grip a cable.

The numeral 19 designates a cable which is extended through the passages 14 and 15 and, as shown, its end is turned back so as to form a loop around the central part of the body in which the elliptical passage 15 is formed and the binding screws 18 when extended inwardly engage the rope or cable and secure it in position.

In addition to the binding screws 18 a further clamping means for the wire rope or cable is provided. This clamping means comprises a clamp block 20 which is relatively long and flat and is introduced into a slot 21 formed in the top of the body 9 and extending in the direction of the length of the passage 15 at its highest part. The slot 21 opens into the passage 15 and the inner edge of the clamping block 20 is longitudinally arcuate to conform to the passage and to the adjacent part of the wire cable or rope and is also longitudinally channeled as shown in Fig. 2 to partially receive the rope.

At opposite sides of the slot 21 the radial recesses 22 are formed in the body 9 which open into the slot and the floor of each recess has a tapped passage 23 extending longitudinally into the body 9. At each side of the clamp block 20 there is formed integral with the block the laterally extending lug 20' which has a suitable passage for alinement with the adjacent passage 23 to receive a tap screw 24. These tap screws engage in the threaded passages 23 and draw the block inwardly to compress and clamp the rope or cable in the manner shown.

From the foregoing it will be readily seen that when the wire rope 19 is secured to the holding or gripper body 9 relative rotation of the body 1 and body 9 may be had without danger of twisting the rope. However, the body 9 might accidentally come out of the socket unless means is provided to prevent this and one such means consists in providing the stem 10 with the encircling groove 24 and extending transversely through the neck 3 upon opposite sides of the stem 10, securing or locking screws 25 which are positioned so that each will extend part way into the passage 4 for engagement in the groove 24. Thus the body 9 will be held against axial movement in the socket but will be free to rotate therein.

In Fig. 3 a modified construction is shown for maintaining the rope gripper or holding body in its socket. In this figure the socket is indicated generally by the reference character 5' and the gripper is indicated by the character 9'. No detailed description will be given of the gripper here shown as it is of exactly the same construction as the one shown in Figures 1 and 2 with the exception that the stem at the lower end of the body and here indicated by the numeral 10', is of constant diameter throughout instead of being provided with an encircling channel such as is formed in the stem 10.

In order to hold the gripper 9' in position in the socket there is provided a guard plate 26 which is disposed across between the arms of the body, such arms being here indicated by the numeral 6'. The ends of this plate are turned upwardly as indicated at 27 and are secured to the arms 6' by bolts 28 or in any other suitable manner. It will thus be seen that the gripper body for the wire rope or cable will not only be effectively maintained against displacement from its socket but will be free to rotate therein as may be necessary.

From the foregoing it will be readily seen that the device herein described is of relatively simple construction and may be easily and economically manufactured and at the same time it provides a strong and durable means of swivelly securing a rope end to a fixed object or to any other cable or to a moving machine as may be desired.

What is claimed is:

1. A rope swivel and clamp comprising a body formed for connection with a support and having a cup-like socket provided with an axial opening, a body of substantially pear-like form providing an axially extending curved tapering bearing surface and disposed in inverted position in said socket, the socket having a correspondingly curved opposing surface, a stem extending from the smaller end of the body and extending into said opening, said stem and the body integral therewith having a rope end receiving passage, means for securing said rope end in the passage, and a bearing mounted in said socket surface and engaged by the tapered bearing surface of the body.

2. A rope clamp and swivel comprising an elongated body having an end portion of cup shape providing an open top socket, a neck-like extension on the said end of the body coaxial with the socket and having an axial passage opening into the socket, a body of substantially pear-like form having the smaller end fitting within said socket and having a stem extending axially therefrom through said neck passage, said body having a rope receiving passage extending axially through the stem and forming a loop within the stem carrying body, means carried by the stem carrying body extending into the loop portion of the passage for removably clamping the rope end in the rope receiving passage, and means for maintaining the second mentioned body against movement axially of the socket but permitting its rotary movement therein.

3. A rope gripper and swivel comprising, a body having an end formed to provide a cup-like socket having a curved axially tapering inner wall surface and terminating at the narrower end in a neck-like extension having an axial passage opening into the socket, a substantially pear-shaped gripper adapted to position within said socket and having an integral stem extending from the tapered end thereof, said stem being designed to snugly position within said neck passage, said stem and body integral therewith having a rope end receiving passage, means for securing the rope end in said last passage, and a retaining member secured across the top of said socket above the pear-shaped member for maintaining the latter member against undesired axial movement in the socket.

4. A rope gripper and swivel comprising a body having an end formed to provide a cup-like curved wall socket and terminating in a neck-like extension having an axial passage opening into the socket, a substantially pear-shaped gripper adapted to position within said socket, and having an integral stem extending from the tapered end thereof, said stem being designed to snugly position within said neck passage, said stem and the body integral therewith having a rope end receiving passage, means for securing the rope end in said last passage, comprising binding screws threaded into the pear-shaped body for engagement with a rope in the rope receiving passage, said last body having a slot in the top thereof, said slot opening into the rope receiving passage, a clamping block insertible into said slot for engagement with a rope, and means for securing the clamping block in the slot.

JOSEPH R. FUREY.